H. SAMSON.
Draft-Equalizer for Harvesters.
No. 197,411. Patented Nov. 20, 1877.
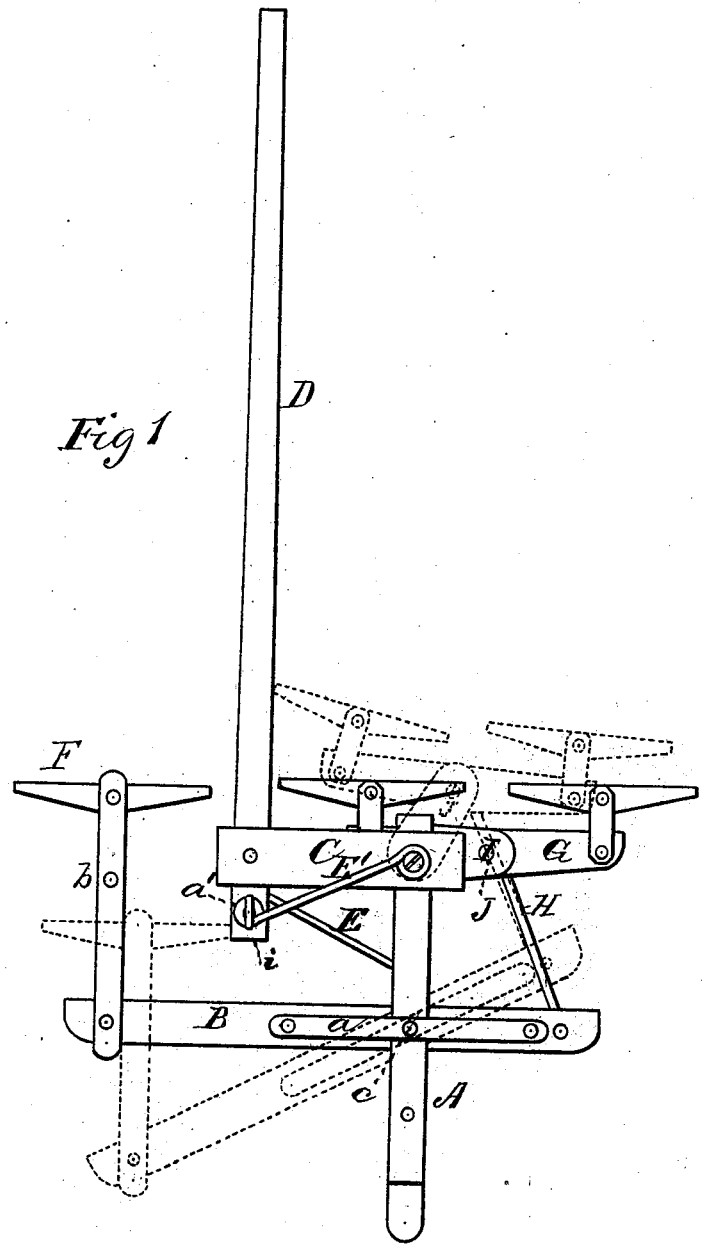
WITNESSES
INVENTOR
ATTORNEY

UNITED STATES PATENT OFFICE.

HIRAM SAMSON, OF FILLMORE, MINNESOTA.

IMPROVEMENT IN DRAFT-EQUALIZERS FOR HARVESTERS.

Specification forming part of Letters Patent No. 197,411, dated November 20, 1877; application filed June 5, 1877.

*To all whom it may concern:*

Be it known that I, HIRAM SAMSON, of Fillmore, in the county of Fillmore and State of Minnesota, have invented a new and valuable Improvement in Three-Horse Eveners for Reaping-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my invention.

This invention has relation to improvements in three-horse eveners for reaping and harvesting machines, and for other implements.

The object of my invention is to produce an evener which will throw the draft into the center and effectually prevent any tendency to side draft.

The nature of my invention will be fully set forth in the accompanying description and claims.

In the annexed drawings, the letter A designates the main draft bar or pole of my improved device, secured, in the customary manner, to the harvester or reaper frame, and provided with a pivoted cross-bar, B. This latter is secured to the draft-bar, above and below, by the usual straps $a$ $a$, and projects upon one side thereof twice as far as on the other. The draft-bar A is provided at its free end with a cross-piece, C, of about one-half the length of the longer arm of cross-bar B, to which is rigidly secured the tongue D.

The part C is let into both the main draft-bar and the tongue, preferably, and the latter extends beyond it a certain distance, as shown in the drawing. To this rearward extension $i$ is rigidly secured one end of a metallic brace, E', the other end of which is rigidly secured to the beam C at its junction with the main draft-bar A.

The tongue is braced to the main draft-bar A in front of the bar B by means of a metallic bar, E. One bolt, $a'$, serves to attach the adjacent ends of the braces E E' to the rearward extension of the tongue D. By this means the tongue, the cross-piece C, and the draft-bar A are, to all intents and purposes, made perfectly rigid.

The single-tree F is attached to a strong bar, $b$, which is pivoted to the end of the longer part of the cross-bar B, in the customary manner; but the double-tree G is connected, not only to the short arm of the said cross-bar by a pivoted metallic arm, H, but also with the end of the main draft-bar A by a rod or plate, I. The double-tree vibrates freely in relation both to the rod A and plate I, a single bolt, J, serving to secure both, the one above and the other below, centrally thereto.

It will be observed, reference being had to the drawing, that the horses are harnessed, one on one side of the pole and the other two on the other side thereof, the single horse being attached to the single-tree on the longer arm of bar B, and the double team to the double-tree on the short one. Should the double team draw more than its share of the burden, the bar B will swing upon its pivot $c$, throwing its short arm to the front and the longer arm to the rear, and the vibration of the plate I will throw the double-tree inward toward the central line of draft—that is, toward the pole—thereby lessening the leverage of the short arm and increasing that of the long arm of bar B. Should the single horse be drawing more than its load, the longer arm of bar B will swing inward toward the center—that is, toward the pole D—thereby lessening its leverage, and, through the medium of plate I, increasing that of the short arm of the bar B. By this means any excess of draft on one side of pole D, instead of being exercised at the side, thereby causing the harvester to advance obliquely to its proper course, is thrown to the center of the line of draft, and the harvester is kept with its length in the direction of its proper course.

Having described my invention, I claim as new and desire to secure by Letters Patent—

1. The draft attachment for harvesting-machines, consisting of the pole, its end cross-piece, and the main draft-bar, adapted to be secured to the frame, substantially as specified.

2. The combination, with the main draft-bar A and its cross-piece C, of the rearwardly-extended pole D and the crossed braces E E', secured at one end to the extended rear end of said pole, and at the other to the said draft-bar, substantially as specified.

3. The combination, with the angular draft attachment D C A and the pivoted cross-bar B, having on its longer end the single-tree bar $b$, of the pivoted rod H, the double-tree G, and a pivoted plate or rod, I, coupling the pole and double-tree, substantially as specified.

In testimony that I claim the above I have hereunto subscribed my name in the presence of two witnesses.

HIRAM SAMSON.

Witnesses:
J. Q. FARMER,
A. R. HOLMAN.